United States Patent
Soellner

(10) Patent No.: US 8,019,540 B2
(45) Date of Patent: Sep. 13, 2011

(54) METHOD AND APPARATUS FOR PROCESSING NAVIGATIONAL SIGNALS IN A SATELLITE NAVIGATION SYSTEM

(75) Inventor: Matthias Soellner, Gauting (DE)

(73) Assignee: European Space Agency, Paris (FR)

( * ) Notice: Subject to any disclaimer, the term of this patent is extended or adjusted under 35 U.S.C. 154(b) by 405 days.

(21) Appl. No.: 10/424,694

(22) Filed: Apr. 29, 2003

(65) Prior Publication Data

US 2003/0204309 A1    Oct. 30, 2003

(30) Foreign Application Priority Data

Apr. 29, 2002   (DE) .................................. 102 19 216

(51) Int. Cl.
*G06F 19/00* (2006.01)
*H04B 7/185* (2006.01)
*H03H 7/30* (2006.01)

(52) U.S. Cl. .................... 701/214; 342/358; 342/357.03; 375/235

(58) Field of Classification Search .................. 701/214, 701/215, 216, 213; 342/357.01, 357.02, 342/457, 357.12, 357.15, 357.03, 358; 375/209, 375/149, 152, 235, 142, 143
See application file for complete search history.

(56) References Cited

U.S. PATENT DOCUMENTS

| | | | | |
|---|---|---|---|---|
| 4,578,678 A * | 3/1986 | Hurd | ........................ | 342/357.12 |
| 5,101,416 A * | 3/1992 | Fenton et al. | .................. | 375/150 |
| 5,343,209 A * | 8/1994 | Sennott et al. | ........... | 342/357.02 |
| 5,414,729 A * | 5/1995 | Fenton | ........................ | 375/149 |
| 5,459,763 A * | 10/1995 | Hori et al. | ........................ | 375/354 |
| 5,541,600 A * | 7/1996 | Blumenkrantz et al. | ...... | 341/139 |
| 5,724,046 A * | 3/1998 | Martin et al. | ............ | 342/357.12 |
| 5,812,087 A * | 9/1998 | Krasner | ..................... | 342/357.1 |
| 6,044,071 A | 3/2000 | Spilker, Jr. | ..................... | 370/320 |
| 6,075,810 A * | 6/2000 | Raghavan et al. | ............ | 375/130 |
| 6,366,599 B1 * | 4/2002 | Carlson et al. | ................ | 375/130 |
| 6,493,378 B1 * | 12/2002 | Zhodzishsky et al. | ........ | 375/149 |
| 6,967,992 B1 | 11/2005 | Rabaeijs et al. | | |
| 7,120,198 B1 * | 10/2006 | Dafesh et al. | ................. | 375/261 |
| 7,224,721 B2 * | 5/2007 | Betz et al. | ...................... | 375/152 |
| 2002/0012387 A1 | 1/2002 | Shakeri et al. | ................ | 375/150 |
| 2002/0015439 A1 | 2/2002 | Kohli et al. | ................... | 375/148 |
| 2006/0038716 A1* | 2/2006 | Lestarquit | ................ | 342/357.03 |

FOREIGN PATENT DOCUMENTS

| | | |
|---|---|---|
| DE | 698 34 235 T2 | 1/2007 |
| DE | 603 05 066 T2 | 4/2007 |

OTHER PUBLICATIONS

Status of Galileo Frequency and Signal design (Guenter W. Hein et al; Sep. 2002).*
A software Simulation Toll for GNSS2 BOC Signals Analysis. Ries, L et al, Sep. 2002).*

(Continued)

*Primary Examiner* — Ronnie Mancho
(74) *Attorney, Agent, or Firm* — Crowell & Moring LLP

(57) ABSTRACT

In a method and apparatus for processing a received navigation signal x'(t) of a satellite navigation system, the received navigation signal x'(t) contains at least four navigation codes. The navigation codes are modulated by a complex BOC signal and a defined subcarrier frequency such that the resulting signal has a constant amplitude. The resulting signal is then also modulated by means of a carrier signal. The navigation signal x'(t) is demodulated and then processed by a complex correlation with at least one reference signal.

6 Claims, 2 Drawing Sheets

OTHER PUBLICATIONS

Overview of the GPS M Code Signal; Capt. Brian C. Barker et al.

Design and Performance of Code Tracking for the GPS M Code Signal; John W. Betz, The MITRE Corporation.

Kaplan, Elliott D., Understanding GPS Principles and Applications, 1996 Artech House Inc., pp. 83, 119-121.

EPO submission dated Nov. 5, 2007 in related application EP 03007739.0-2220.

Confirmation from European Patent Office dated Nov. 22, 2007 in related EP 03007739.0-2220.

Betz, John W., The MITRE Corporation, "Design and Performance of Code Tracking for the GPS M Code Signal.".

EPO Technical Board of Appeal Decision dated Dec. 20, 2007 in related EP 03007739.0-2220.

Betz, John W., "Design and Performance of Code Tracking for the GPS M Code Signal."

Barker, Capt. Brian C., et al., "Overview of the GPS M Code Signal."

Hein, Guenter W., et al., Galileo, "Status of Galileo Frequency and Signal Design."

Ries, L., et al., "A Software Simulation Tool for GNSS2 BOC Signals Analysis", ION GPS 2002, Sep. 24-27, 2002, Portland, OR, pp. 2225-2239.

Soellner, M., et al., "The impact of linear and non-linear signal distortions on Galileo code tracking accuracy," ION GPS 2002, Sep. 24-27, 2002, Portland, OR, pp. 1270-1285.

Burger, Thomas., et al., "Selected Signal Analysis Results for Galileo," ION GPS 2001, Sep. 11-14, 2001, Salt Lake City, UH, pp. 1291-1303.

Holmes, J.K., "Code Tracking Loop Performance Including the Effects of Channel Filtering and Gaussian Interference," Proceedings of the IAIN World Congress in association with the U.S. ION Annual Meeting, Jun. 26-28, 2000, San Diego, CA, pp. 382-398.

* cited by examiner

_US 8,019,540 B2_

METHOD AND APPARATUS FOR PROCESSING NAVIGATIONAL SIGNALS IN A SATELLITE NAVIGATION SYSTEM

BACKGROUND AND SUMMARY OF THE INVENTION

This application claims the priority of German patent application 102 19 216.2, filed 29 Apr. 2002, the disclosure of which is expressly incorporated by reference herein.

The present invention relates to a method and apparatus for processing a navigation signal of a satellite navigation system. In addition to the well known GPS, there are other satellite navigation systems, such as GLONASS and the planned GALILEO system.

It is known that navigation signals can be modulated by a Binary Offset Coding (BOC) method, as discussed, for example in J. W. Betz: "Design and Performance of Code Tracking for the GPS M Code Signal", the MITRE Corporation, September 2000.

One object of the present invention is to provide an improved method for processing a navigation signal received from a satellite navigation system, which navigation signal is generated by modulating navigation codes using a complex BOC signal. (As used herein, the term "complex signal" refers to the mathematical concept of complex numbers, and not to a possible complexity of the signal structure.)

This and other objects and advantages are achieved by the processing method and apparatus according to the invention. On the one hand, the invention comprises a method of processing a signal received from a satellite navigation system. Without limiting the invention, the special examples described hereinafter are, as a rule, based on four navigation codes, which may be intended for or accessible to different applications or user groups. The codes may, for example, be different civil and military navigation codes; or codes of varying precision may be provided which can be processed by different user groups or terminals depending on the access authorization.

According to the invention, the navigation codes are modulated by a complex BOC signal with a defined subcarrier frequency. Basically, a suitable BOC modulation of the navigation codes can be selected such that the resulting signal has a constant amplitude. The latter signal is then modulated by a carrier signal to generate a navigation signal having an envelope of a constant amplitude. The carrier signal is, for example, on the order of 1 GHz or more (e.g., 1.0-2.0 GHz). The navigation codes may have a frequency of several MHz or several tens of MHz (e.g., between 5 MHz and 20 MHz). The subcarrier frequency may be on the order of several MHz or several tens of MHz (e.g., between 10 and 50 MHz).

According to the invention, processing of the navigation signal comprises a complex correlation of the received navigation signal with at least one reference signal. Each reference signal is formed by multiplication of one of the navigation codes by a subcarrier signal that corresponds to a signal for a matched filtering of those fractions of the navigation signal which contain the respective navigation code. Thus, reference signals are generated which, in a correlation, interact with those fractions of the navigation signal that (expressed as a mathematical notation) contain the corresponding navigation code by which the subcarrier signal is multiplied.

According to a further feature of the invention, the navigation signal is correlated with at least one reference signal which occurs as a summand formed by transformation of the navigation signal to a sum of subcarrier signals, taking into account of the characteristics of the navigation codes. It is therefore observed within the framework of the transformation how the navigation codes behave, particularly when they may assume which values. A corresponding transformation of the navigation signal to a sum of individual subcarrier signals as components of the navigation signal can then be carried out. This transformation can take place before implementation of the method according to the invention, and the result of the transformation can be correspondingly implemented within the scope of the process.

In particular (for example, for the special case of four navigation codes), processing of the navigation signal takes place by a complex correlation with at least one reference signal with:

$$r_1 = e_1 \cdot C \cdot \Bigg[ \cdot \text{sign}(\cos(2\pi f_s t)) + $$
$$j\text{sign}(\sin(2\pi f_s t)) + (1+j) \cdot \frac{\sqrt{2}}{2} \cdot \text{sign}(\sin(2\pi f_s t + \pi/4)) + $$
$$(-1+j) \cdot \frac{\sqrt{2}}{2} \cdot \text{sign}(\sin(2\pi f_s t - \pi/4)) \Bigg]$$

$$r_2 = e_2 \cdot C \cdot \Bigg[ \cdot \text{sign}(\cos(2\pi f_s t)) - j\text{sign}(\sin(2\pi f_s t)) + (1-j) \cdot \frac{\sqrt{2}}{2} \cdot $$
$$\text{sign}(\sin(2\pi f_s t + \pi/4)) + (-1-j) \cdot \frac{\sqrt{2}}{2} \cdot \text{sign}(\sin(2\pi f_s t - \pi/4)) \Bigg]$$

$$r_3 = e_3 \cdot C \cdot \Bigg[ \cdot j \cdot \text{sign}(\cos(2\pi f_s t)) + j\text{sign}(\sin(2\pi f_s t)) + $$
$$(-1+j) \cdot \frac{\sqrt{2}}{2} \cdot \text{sign}(\sin(2\pi f_s t + \pi/4)) + $$
$$(-1-j) \cdot \frac{\sqrt{2}}{2} \cdot \text{sign}(\sin(2\pi f_s t - \pi/4)) \Bigg]$$

$$r_4 = e_4 \cdot C \cdot \Bigg[ \cdot j \cdot \text{sign}(\cos(2\pi f_s t)) - j\text{sign}(\sin(2\pi f_s t)) + (1+j) \cdot \frac{\sqrt{2}}{2} \cdot $$
$$\text{sign}(\sin(2\pi f_s t + \pi/4)) + (1-j) \cdot \frac{\sqrt{2}}{2} \cdot \text{sign}(\sin(2\pi f_s t - \pi/4)) \Bigg]$$

wherein, e1, e2, e3, e4 represent the navigation codes, and fs corresponds to the subcarrier frequency of the BOC signal. C is a constant.

In particular, it is provided that, as a result of the complex correlation of the navigation signal with at least one reference signal, a time offset between a navigation code and a reference signal is determined. As a result, the method according to the invention can be used to synchronize a navigation code and the corresponding reference signal, which represents a basis for a position determination.

For a transmission of the navigation signal to a terminal, as a rule, an additional modulation is provided. Thus, as described above, the navigation signal is further modulated by a carrier signal. Before the complex correlation, the carrier signal is first preferably demodulated.

In addition, the present invention provides a terminal for a satellite navigation system which has at least one receiving device and a complex correlation unit for receiving and processing a navigation signal. According to the invention, the complex correlation unit has at least one complex correlator that generates at least one reference signal. Each reference signal is formed by multiplication of the navigation code by a subcarrier signal that corresponds to a signal for a matched filtering of those fractions of the navigation signal that contain the respective navigation code. Particularly the above statements concerning the method according to the invention can apply analogously to the other characteristics, details and advantages of the terminal according to the invention.

In a preferred embodiment of the invention, the complex correlator generates at least one reference signal as a summand of a transformation of the navigation signal to a sum of subcarrier signals taking into account the characteristics of the navigation codes. In particular, it may be provided that the complex correlation unit has at least one complex correlator which generates at least one reference signal with:

$$r_1 = e_1 \cdot C \cdot \left[ \cdot \text{sign}(\cos(2\pi f_s t)) + \right.$$
$$j\text{sign}(\sin(2\pi f_s t)) + (1+j) \cdot \frac{\sqrt{2}}{2} \cdot \text{sign}(\sin(2\pi f_s t + \pi/4)) +$$
$$\left. (-1+j) \cdot \frac{\sqrt{2}}{2} \cdot \text{sign}(\sin(2\pi f_s t - \pi/4)) \right]$$

$$r_2 = e_2 \cdot C \cdot \left[ \cdot \text{sign}(\cos(2\pi f_s t)) - j\text{sign}(\sin(2\pi f_s t)) + (1-j) \cdot \frac{\sqrt{2}}{2} \cdot \right.$$
$$\left. \text{sign}(\sin(2\pi f_s t + \pi/4)) + (-1-j) \cdot \frac{\sqrt{2}}{2} \cdot \text{sign}(\sin(2\pi f_s t - \pi/4)) \right]$$

$$r_3 = e_3 \cdot C \cdot \left[ \cdot j \cdot \text{sign}(\cos(2\pi f_s t)) + j\text{sign}(\sin(2\pi f_s t)) + \right.$$
$$(-1+j) \cdot \frac{\sqrt{2}}{2} \cdot \text{sign}(\sin(2\pi f_s t + \pi/4)) +$$
$$\left. (-1-j) \cdot \frac{\sqrt{2}}{2} \cdot \text{sign}(\sin(2\pi f_s t - \pi/4)) \right]$$

$$r_4 = e_4 \cdot C \cdot \left[ \cdot j \cdot \text{sign}(\cos(2\pi f_s t)) - j\text{sign}(\sin(2\pi f_s t)) + (1+j) \cdot \frac{\sqrt{2}}{2} \cdot \right.$$
$$\left. \text{sign}(\sin(2\pi f_s t + \pi/4)) + (1-j) \cdot \frac{\sqrt{2}}{2} \cdot \text{sign}(\sin(2\pi f_s t - \pi/4)) \right]$$

"Complex correlation unit" and "complex correlator" should be understood here also in the mathematical sense of complex numbers; thus, they are devices that are constructed for the processing of signals having a real part and an imaginary part. By means of such a terminal, navigation signals that contain at least four navigation codes and were modulated with a suitable complex BOC signal with a constant envelope can be processed.

In particular, it is provided that the complex correlation unit is constructed such that, by means of the at least one complex correlator, a time offset is determined between a navigation code of the navigation signal and a reference signal.

For transmission of the navigation signal to a terminal, as a rule, an additional modulation is provided. Thus, as a rule, the navigation signal is additionally modulated by means of a carrier signal. It is therefore preferably provided that a demodulation device for the demodulation of a carrier signal is connected in front of the complex correlation unit.

The terminal may be constructed as a user terminal (for example, as a portable terminal or as a terminal which is integrated in a landcraft, watercraft or aircraft). It may be constructed either for receiving navigation signals of a single satellite navigation system or of navigation signals of several satellite navigation systems, such as a combined GPS-GALILEO terminal. The user terminal may, for example, also be constructed as a combined terminal of a radio communications system and of a satellite navigation system, for example, as a mobile telephone which also has devices for the satellite navigation, or as a satellite navigation terminal which also has devices for data exchange via a mobile radio communications system.

Another object of the invention is to provide a computer program for controlling a complex correlation unit of a terminal for a satellite navigation system. In this case, the computer program is constructed for controlling at least one complex correlator for generating at least one reference signal. Each reference signal is formed by multiplication of one of the navigation codes by a subcarrier signal that corresponds to a signal for matched filtering of those fractions of a navigation signal which contain the respective navigation code. Particularly the above statements concerning the method according to the invention can analogously apply to the other characteristics, details and advantages of the computer program according to the invention.

In a further preferred embodiment of the invention, the at least one correlator for generating at least one reference signal is controlled to form a reference signal as the summand of a transformation of the navigation signal to a sum of subcarrier signals while taking into account the characteristics of the navigation codes.

In still another embodiment of the invention, the computer program according to the invention is constructed to control at least one complex correlator for generating at least one reference signal:

$$r_1 = e_1 \cdot C \cdot \left[ \cdot \text{sign}(\cos(2\pi f_s t)) + \right.$$
$$j\text{sign}(\sin(2\pi f_s t)) + (1+j) \cdot \frac{\sqrt{2}}{2} \cdot \text{sign}(\sin(2\pi f_s t + \pi/4)) +$$
$$\left. (-1+j) \cdot \frac{\sqrt{2}}{2} \cdot \text{sign}(\sin(2\pi f_s t - \pi/4)) \right]$$

$$r_2 = e_2 \cdot C \cdot \left[ \cdot \text{sign}(\cos(2\pi f_s t)) - j\text{sign}(\sin(2\pi f_s t)) + (1-j) \cdot \frac{\sqrt{2}}{2} \cdot \right.$$
$$\left. \text{sign}(\sin(2\pi f_s t + \pi/4)) + (-1-j) \cdot \frac{\sqrt{2}}{2} \cdot \text{sign}(\sin(2\pi f_s t - \pi/4)) \right]$$

$$r_3 = e_3 \cdot C \cdot \left[ \cdot j \cdot \text{sign}(\cos(2\pi f_s t)) + j\text{sign}(\sin(2\pi f_s t)) + \right.$$
$$(-1+j) \cdot \frac{\sqrt{2}}{2} \cdot \text{sign}(\sin(2\pi f_s t + \pi/4)) +$$
$$\left. (-1-j) \cdot \frac{\sqrt{2}}{2} \cdot \text{sign}(\sin(2\pi f_s t - \pi/4)) \right]$$

$$r_4 = e_4 \cdot C \cdot \left[ \cdot j \cdot \text{sign}(\cos(2\pi f_s t)) - j\text{sign}(\sin(2\pi f_s t)) + (1+j) \cdot \frac{\sqrt{2}}{2} \cdot \right.$$
$$\left. \text{sign}(\sin(2\pi f_s t + \pi/4)) + (1-j) \cdot \frac{\sqrt{2}}{2} \cdot \text{sign}(\sin(2\pi f_s t - \pi/4)) \right]$$

Finally, the present invention comprises a computer program that is constructed to interact with a terminal of a satellite navigation system, and contains a machine-readable program carrier on which an above-described computer program is stored in the form of electronically readable control signals. The control signals can be stored in any suitable form read electronically by electrical, magnetic, electro-magnetic, electro-optical or other electronic methods. Examples of such program carriers are magnetic tapes, floppy disks, hard disks, DC-ROMs or semiconductor devices.

Other objects, advantages and novel features of the present invention will become apparent from the following detailed description of the invention when considered in conjunction with the accompanying drawings.

DETAILED DESCRIPTION OF THE DRAWINGS

Figure 1:
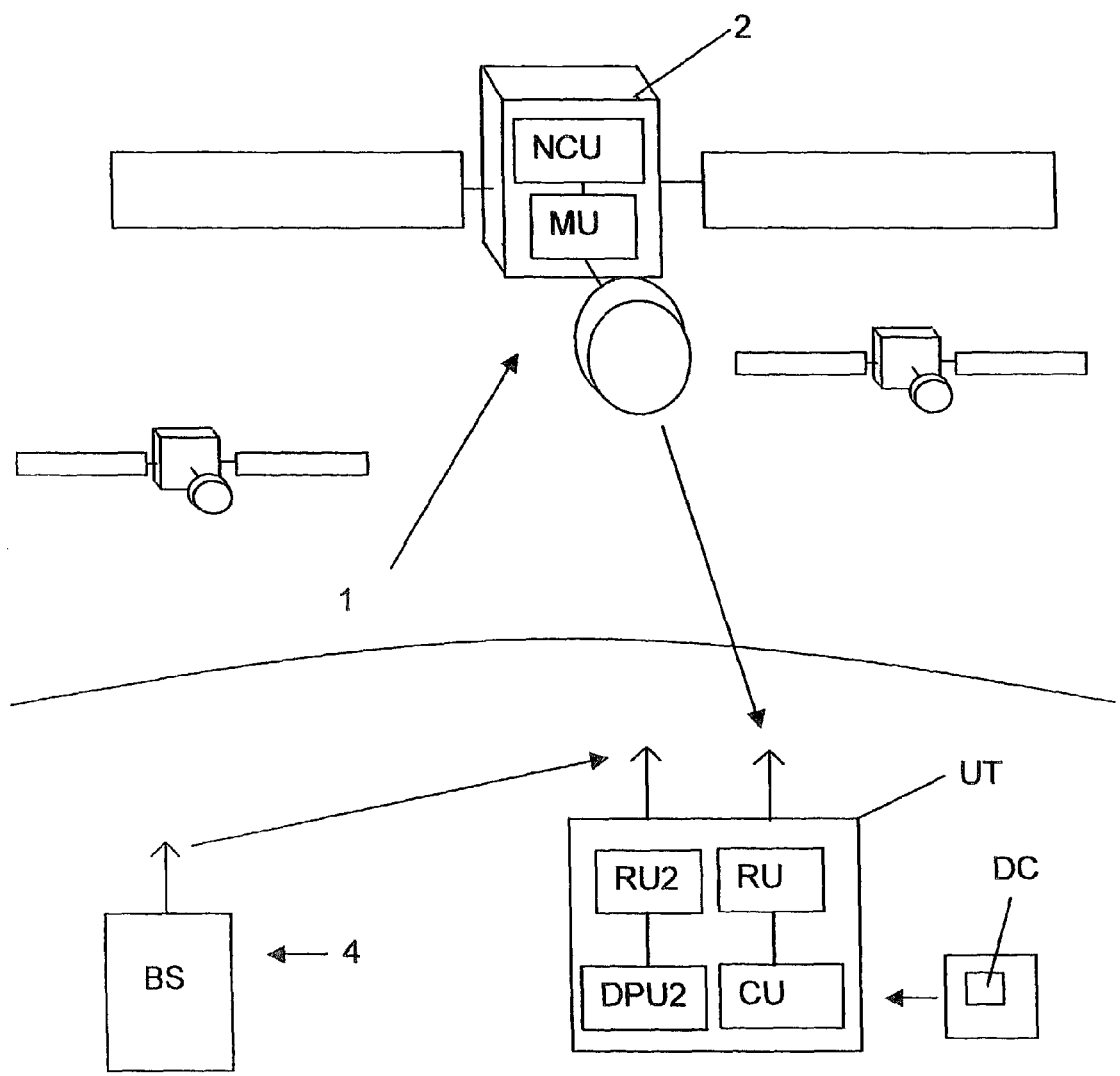
FIG. 1 is a schematic representation of a satellite navigation system.

An application of the invention within the scope of the currently planned GALILEO satellite navigation system will now be considered. FIG. 1 is a schematic view of a user terminal UT for a satellite navigation system 1 (in this example, for the GALILEO system). Schematically viewed, each navigation satellite 2 of the GALILEO navigation system 1 has a navigation code unit (NCU) for generating navigation codes e1($t$), e2($t$), e3($t$), e4($t$), which may assume the values +1 and −1, as a function of the time. Furthermore, each navigation satellite 2 has a modulation unit (MU) for modulating the navigation codes e1($t$), e2($t$), e3($t$), e4($t$) by means of a complex BOC signal.

As the starting point for navigation signals, the following basic structure of the signal is suggested for GALILEO, which signal is obtained by the modulation of the navigation codes e1($t$), e2($t$), e3($t$), e4($t$) by means of a complex LOC signal (linear offset coding):

$$x(t)=[e_1(t)+j \cdot e_3(t)] \cdot \exp(j \cdot 2\pi f_s t)+[e_2(t)+j \cdot e_4(t)] \cdot \exp(-j \cdot 2\pi f_s t)$$

wherein j is the imaginary unit with $j^2=-1$. $f_S$ is the subcarrier of the LOC signal.

When the characteristics of the navigation codes e1($t$), e2($t$), e3($t$), e4($t$) (particularly their temporal course) is taken into account, the above-mentioned signal x(t) can basically be rewritten in the following form:

$$x(t) = \begin{cases} 2 \cdot \sin(2\pi f_s t + k_1 \cdot \pi/2) \cdot [1 + j \cdot k_2] & \text{(Case 1)} \\ 2 \cdot \sqrt{2} \cdot (j)^{k_1} \cdot \sin(2\pi f_s t + k_2 \cdot \pi/4) & \text{(Case 2)} \end{cases}$$

wherein $k_1 \in \{1,2,3,4\}$ and $k_2 \in \{-1, +1\}$.

When a transition $\sin(x) \rightarrow \frac{1}{\sqrt{2}}.$ sign(sin(x)) is then selected, the signal obtained by modulation of the navigation codes e1($t$), e2($t$), e3($t$), e4($t$) by means of a complex BOC signal is:

$$x'(t) = \begin{cases} \sqrt{2} \cdot \text{sign}(\sin(2\pi f_s t + k_1 \cdot \pi/2)) \cdot [1 + j \cdot k_2] & \text{(Case 1)} \\ 2 \cdot (j)^{k_1} \cdot \text{sign}(\sin(2\pi f_s t + k_2 \cdot \pi/4)) & \text{(Case 2)} \end{cases}$$

with the important characteristic of a constant amplitude.

In the knowledge of these conversions and taking account the characteristics of the navigation codes e1($t$), e2($t$), e3($t$), e4($t$) and the relationship between $k_1$ and $k_2$ and the navigation codes e1($t$), e2($t$), e3($t$), e4($t$), the above-mentioned LOC signal can be converted to a sum of subcarrier signals which contains at least the following summands:

The desired navigation signal is finally obtained by the transformations $\sin(x) \rightarrow \text{sign}(\sin(x))$ and $\cos(x) \rightarrow \text{sign}(\cos(x))$, and by the modulation of the resulting signal by means of a suitable high-frequency carrier signal. It is demonstrated that, in this form of the navigation signal, only four summands are present, which are formed by a product of a subcarrier signal with a single navigation code. These subcarrier signals are used to process the navigation signal according to the invention in the complex correlators of the terminal.

The navigation signal thus obtained is transmitted from the navigation satellite 2 to the terminal UT, and is received there by a receive unit RU. It is processed in a correlation unit CU by means of the suitable correlation.

Figure 2:
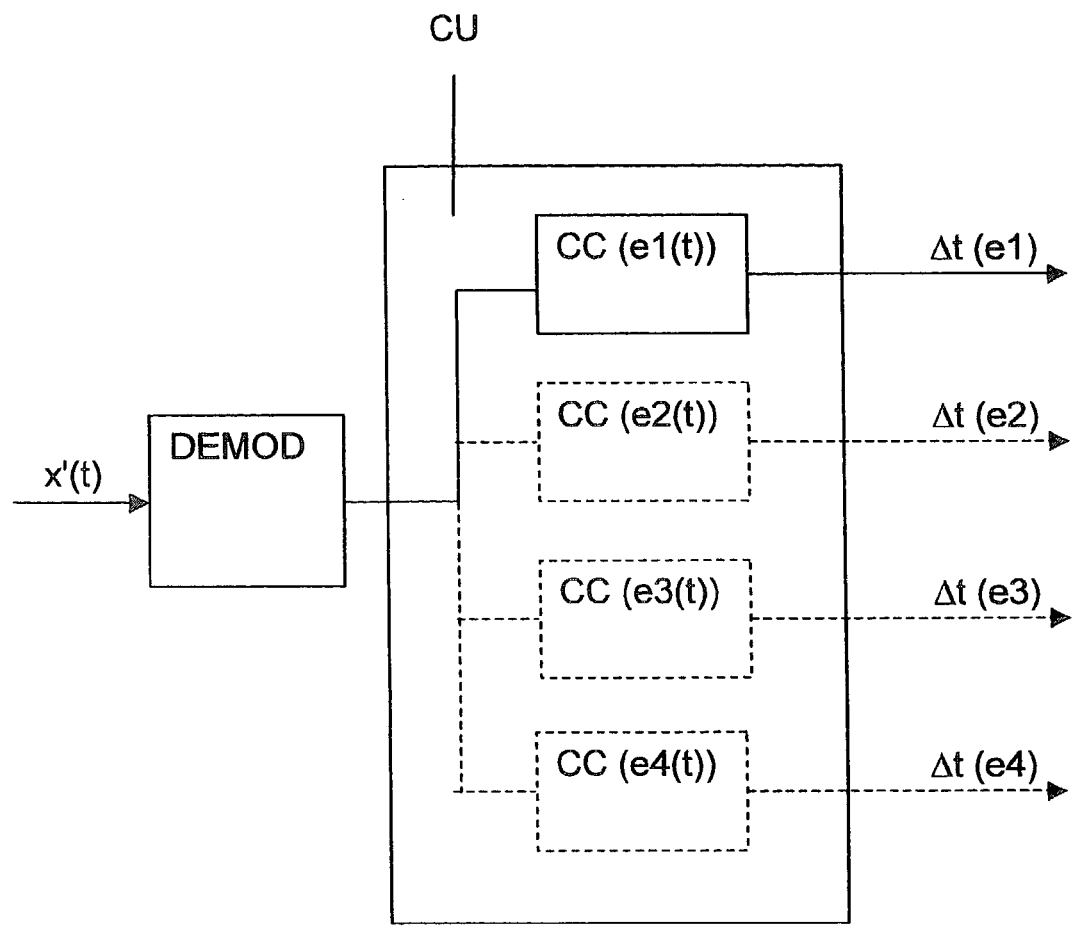
FIG. 2 is a schematic representation of a correlation unit according to the present invention.

FIG. 2, which is a schematic view of the correlation unit CU of the terminal UT, shows the demodulation device DEMOD for the demodulation of the carrier signal connected in front of the correlation unit CU. The received navigation signal is fed to the demodulation device DEMOD. The carrier signal is demodulated, and the demodulated signal is fed to the correlation unit CU. The latter has at least one complex correlator CC(ei(t)) with i=1,2,3,4. Depending on which of the navigation codes the terminal may or should process, the complex correlation unit is constructed for processing the corresponding navigation code e1($t$), e2($t$), e3($t$), e4($t$)). The complex correlation unit may therefore have one, two, three or four complex correlators CC(ei(t)).

All navigation codes e1($t$), e2($t$), e3($t$), e4($t$)) are contained in the navigation signal. The reference signal can be synchronized with the corresponding navigation code by correlation of the navigation signal with a reference signal $r_1, r_2, r_3, r_4$ with $$r_1 = e_1 \cdot C \cdot \left[ \cdot \text{sign}(\cos(2\pi f_s t)) + j \text{sign}(\sin(2\pi f_s t)) + (1+j) \cdot \frac{\sqrt{2}}{2} \cdot \text{sign}(\sin 2\pi f_s t + \pi/4)) + (-1+j) \cdot \frac{\sqrt{2}}{2} \cdot \text{sign}(\sin(2\pi f_s t - \pi/4)) \right]$$

$$r_2 = e_2 \cdot C \cdot \left[ \cdot \text{sign}(\cos(2\pi f_s t)) - j \text{sign}(\sin(2\pi f_s t)) + (1-j) \cdot \frac{\sqrt{2}}{2} \cdot \text{sign}(\sin 2\pi f_s t + \pi/4)) + (-1-j) \cdot \frac{\sqrt{2}}{2} \cdot \text{sign}(\sin(2\pi f_s t - \pi/4)) \right]$$

$$x(t) = \begin{aligned} & e_1 \cdot \left[ \frac{1}{2} \cdot \exp(j \cdot 2\pi f_s t) + (1+j) \cdot \frac{\sqrt{2}}{4} \cdot \sin(2\pi f_s t + \pi/4) + (-1+j) \cdot \frac{\sqrt{2}}{4} \cdot \sin(2\pi f_s t - \pi/4) \right] + \\ & e_2 \cdot \left[ \frac{1}{2} \cdot \exp(-j \cdot 2\pi f_s t) + (1-j) \cdot \frac{\sqrt{2}}{4} \cdot \sin(2\pi f_s t + \pi/4) + (-1-j) \cdot \frac{\sqrt{2}}{4} \cdot \sin(2\pi f_s t - \pi/4) \right] + \\ & e_3 \cdot \left[ \frac{1}{2} \cdot j \cdot \exp(j \cdot 2\pi f_s t) + (-1+j) \cdot \frac{\sqrt{2}}{4} \cdot \sin(2\pi f_s t + \pi/4) + (-1-j) \cdot \frac{\sqrt{2}}{4} \cdot \sin(2\pi f_s t - \pi/4) \right] + \\ & e_4 \cdot \left[ \frac{1}{2} \cdot j \cdot \exp(-j \cdot 2\pi f_s t) + (1+j) \cdot \frac{\sqrt{2}}{4} \cdot \sin(2\pi f_s t + \pi/4) + (1-j) \cdot \frac{\sqrt{2}}{4} \cdot \sin(2\pi f_s t - \pi/4) \right] + \\ & e_1 \cdot e_2 \cdot e_3 \left[ \frac{1}{2} \cdot j \cdot \exp(-j \cdot 2\pi f_s t) + (-1-j) \cdot \frac{\sqrt{2}}{4} \cdot \sin(2\pi f_s t + \pi/4) + (-1+j) \cdot \frac{\sqrt{2}}{4} \cdot \sin(2\pi f_s t - \pi/4) \right] + \\ & e_1 \cdot e_2 \cdot e_4 \left[ \frac{1}{2} \cdot j \cdot \exp(j \cdot 2\pi f_s t) + (1-j) \cdot \frac{\sqrt{2}}{4} \cdot \sin(2\pi f_s t + \pi/4) + (1+j) \cdot \frac{\sqrt{2}}{4} \cdot \sin(2\pi f_s t - \pi/4) \right] + \\ & e_1 \cdot e_3 \cdot e_4 \left[ \frac{1}{2} \cdot \exp(-j \cdot 2\pi f_s t) + (-1+j) \cdot \frac{\sqrt{2}}{4} \cdot \sin(2\pi f_s t + \pi/4) + (1+j) \cdot \frac{\sqrt{2}}{4} \cdot \sin(2\pi f_s t - \pi/4) \right] + \\ & e_2 \cdot e_3 \cdot e_4 \left[ \frac{1}{2} \cdot \exp(j \cdot 2\pi f_s t) + (-1-j) \cdot \frac{\sqrt{2}}{4} \cdot \sin(2\pi f_s t + \pi/4) + (1-j) \cdot \frac{\sqrt{2}}{4} \cdot \sin(2\pi f_s t - \pi/4) \right] \end{aligned}$$

-continued $$r_3 = e_3 \cdot C \cdot \left[ \cdot j \cdot \text{sign}(\cos(2\pi f_s t)) + j\text{sign}(\sin(2\pi f_s t)) + (-1+j) \cdot \frac{\sqrt{2}}{2} \cdot \right.$$
$$\left. \text{sign}(\sin(2\pi f_s t + \pi/4)) + (-1-j) \cdot \frac{\sqrt{2}}{2} \cdot \text{sign}(\sin(2\pi f_s t - \pi/4)) \right]$$

$$r_4 = e_4 \cdot C \cdot \left[ \cdot j \cdot \text{sign}(\cos(2\pi f_s t)) - j\text{sign}(\sin(2\pi f_s t)) + (1+j) \cdot \frac{\sqrt{2}}{2} \cdot \right.$$
$$\left. \text{sign}(\sin(2\pi f_s t + \pi/4)) + (1-j) \cdot \frac{\sqrt{2}}{2} \cdot \text{sign}(\sin(2\pi f_s t - \pi/4)) \right]$$

The user terminal UT can also be constructed as a terminal of another radio communications system, for example, as a terminal of a mobile radio communications system 4. This mobile radio communications system is outlined in FIG. 2 as an example in the form of a base station BS of the mobile radio communications system. In this case, the user terminal as a second receiving device RU2 and a data processing unit DPU for receiving and processing data of the mobile radio communications system. It may therefore be constructed, for example, has a mobile telephone which additionally contains a satellite navigation device.

The user terminal UT can be equipped with a computer program for processing the navigation signal of the satellite navigation system according to the above-described method, if the other hardware requirements are met in the user terminal UT. The computer program will then permit control of the complex correlation unit CU, especially of the complex correlators CC(ei(t)), for generating the above-mentioned reference signals.

The computer program is preferably installed in the user terminal UT by means of a computer program product containing a machine-readable data carrier DC, on which the computer program is stored in the form of electronically readable control signals. One example would be a chip card with a semiconductor chip in which the computer program is stored. However, all other suitable types of computer program products can also be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of determining information for determining position of a terminal based on a received modulated navigation signal of a satellite navigation system, said received modulated navigation signal containing at least four navigation codes, the received navigation signal being generated by
    encoding the navigation codes in a complex binary offset carrier (BOC) signal with a defined subcarrier frequency such that a resulting encoded navigation signal has a constant amplitude, and modulating the encoded navigation signal onto a carrier signal in a second modulation to generate said modulated navigation signal to be transmitted; said method comprising:
    a satellite of said satellite navigation system transmitting said modulated navigation signal to said terminal;
    said terminal receiving said transmitted modulated navigation signal and demodulating the received modulated navigation signal in order to obtain the encoded navigation signal;
    generating at least one reference signal ($r_1$, $r_2$, $r_3$, $r_4$) by multiplication of one of the at least four navigation codes by a subcarrier signal, said at least one reference signal ($r_1$, $r_2$, $r_3$, $r_4$) being represented by $$r_1 = e_1 \cdot C \cdot \left[ \cdot \text{sign}(\cos(2\pi f_s t)) + \right.$$
$$j\text{sign}(\sin(2\pi f_s t)) + (1+j) \cdot \frac{\sqrt{2}}{2} \cdot \text{sign}(\sin(2\pi f_s t + \pi/4)) +$$
$$\left. (-1+j) \cdot \frac{\sqrt{2}}{2} \cdot \text{sign}(\sin(2\pi f_s t - \pi/4)) \right] \text{ or}$$

$$r_2 = e_2 \cdot C \cdot \left[ \cdot \text{sign}(\cos(2\pi f_s t)) - j\text{sign}(\sin(2\pi f_s t)) + \right.$$
$$(1-j) \cdot \frac{\sqrt{2}}{2} \cdot \text{sign}(\sin(2\pi f_s t + \pi/4)) +$$
$$\left. (-1-j) \cdot \frac{\sqrt{2}}{2} \cdot \text{sign}(\sin(2\pi f_s t - \pi/4)) \right] \text{ or}$$

$$r_3 = e_3 \cdot C \cdot \left[ \cdot j \cdot \text{sign}(\cos(2\pi f_s t)) + j\text{sign}(\sin(2\pi f_s t)) + \right.$$
$$(-1+j) \cdot \frac{\sqrt{2}}{2} \cdot \text{sign}(\sin(2\pi f_s t + \pi/4)) +$$
$$\left. (-1-j) \cdot \frac{\sqrt{2}}{2} \cdot \text{sign}(\sin(2\pi f_s t - \pi/4)) \right] \text{ or}$$

$$r_4 = e_4 \cdot C \cdot \left[ \cdot j \cdot \text{sign}(\cos(2\pi f_s t)) - j\text{sign}(\sin(2\pi f_s t)) + (1+j) \cdot \frac{\sqrt{2}}{2} \cdot \right.$$
$$\left. \text{sign}(\sin(2\pi f_s t + \pi/4)) + (1-j) \cdot \frac{\sqrt{2}}{2} \cdot \text{sign}(\sin(2\pi f_s t - \pi/4)) \right]$$

wherein $e_1$, $e_2$, $e_3$, $e_4$ correspond to one of the at least four navigation codes, $f_s$ corresponds to a subcarrier frequency of the BOC signal and C is a constant;
performing a complex correlation of the encoded navigation signal and said at least one reference signal;
determining a time offset between the navigation code in the encoded navigation signal and said at least one reference signal as a result of said complex correlation; and
using the thus determined time offset as a basis for position determination of said terminal.

2. The method of claim 1, wherein a reference signal is generated for each of the at least four navigation codes, and a complex correlation is performed using the reference signals generated for each of the at least for navigation codes.

3. A method of determining information for determining position of a terminal based on a received modulated navigation signal of a satellite navigation system, the method comprising:
    receiving, by the terminal from a satellite of the satellite navigation system, a modulated navigation signal, wherein the modulated navigation signal includes at least four navigation codes, and wherein the modulated navigation signal is generated by
    encoding the navigation codes in a complex binary offset carrier (BOC) signal with a defined subcarrier frequency such that a resulting encoded navigation signal has a constant amplitude, and
    modulating the encoded navigation signal onto a carrier signal in a second modulation;

demodulating the received modulated navigation signal in order to obtain the encoded navigation signal;

generating at least one reference signal by multiplication of one of the at least four navigation codes by a subcarrier signal;

performing a complex correlation of the demodulated encoded navigation signal and said at least one reference signal;

determining a time offset between the navigation code in the demodulated encoded navigation signal and said at least one reference signal as a result of said complex correlation; and using the determined time offset as a basis for position determination of said terminal.

4. The method according to claim 3, wherein processing of the navigation signal takes place by a complex correlation with at least one reference signal ($r_1, r_2, r_3, r_4$) represented by $$r_1 = e_1 \cdot C \cdot \left[ \cdot \text{sign}(\cos(2\pi f_s t)) + j\text{sign}(\sin(2\pi f_s t)) + (1+j) \cdot \frac{\sqrt{2}}{2} \cdot \text{sign}(\sin(2\pi f_s t + \pi/4)) + (-1+j) \cdot \frac{\sqrt{2}}{2} \cdot \text{sign}(\sin(2\pi f_s t - \pi/4)) \right] \text{ or}$$

$$r_2 = e_2 \cdot C \cdot \left[ \cdot \text{sign}(\cos(2\pi f_s t)) - j\text{sign}(\sin(2\pi f_s t)) + (1-j) \cdot \frac{\sqrt{2}}{2} \cdot \text{sign}(\sin(2\pi f_s t + \pi/4)) + (-1-j) \cdot \frac{\sqrt{2}}{2} \cdot \text{sign}(\sin(2\pi f_s t - \pi/4)) \right] \text{ or}$$

$$r_3 = e_3 \cdot C \cdot \left[ \cdot j \cdot \text{sign}(\cos(2\pi f_s t)) + j\text{sign}(\sin(2\pi f_s t)) + (-1+j) \cdot \frac{\sqrt{2}}{2} \cdot \text{sign}(\sin(2\pi f_s t + \pi/4)) + (-1-j) \cdot \frac{\sqrt{2}}{2} \cdot \text{sign}(\sin(2\pi f_s t - \pi/4)) \right] \text{ or}$$

$$r_4 = e_4 \cdot C \cdot \left[ \cdot j \cdot \text{sign}(\cos(2\pi f_s t)) - j\text{sign}(\sin(2\pi f_s t)) + (1+j) \cdot \frac{\sqrt{2}}{2} \cdot \text{sign}(\sin(2\pi f_s t + \pi/4)) + (1-j) \cdot \frac{\sqrt{2}}{2} \cdot \text{sign}(\sin(2\pi f_s t - \pi/4)) \right]$$

wherein $e_1, e_2, e_3, e_4$ correspond to navigation codes, $f_s$ corresponds to a subcarrier frequency of the BOC signal and C is a constant.

5. The method of claim 4, wherein a reference signal is generated for each of the at least four navigation codes, and a complex correlation is performed using the reference signals generated for each of the at least for navigation codes.

6. A method for processing a received navigation signal of a satellite navigation system by a user terminal, the method comprising:

receiving, by the user terminal, the navigation signal, wherein the navigation signal includes at least four navigation codes ($e_1(t), e_2(t), e_3(t), e_4(t)$) and is modulated by a carrier signal;

processing, by the user terminal, the received navigation signal by demodulating the carrier signal to produce a demodulated navigation signal;

complex correlating the demodulated navigation signal with at least one reference signal ($r_1, r_2, r_3, r_4$) being represented by $$r_1 = e_1 \cdot C \cdot \left[ \cdot \text{sign}(\cos(2\pi f_s t)) + j\text{sign}(\sin(2\pi f_s t)) + (1+j) \cdot \frac{\sqrt{2}}{2} \cdot \text{sign}(\sin(2\pi f_s t + \pi/4)) + (-1+j) \cdot \frac{\sqrt{2}}{2} \cdot \text{sign}(\sin(2\pi f_s t - \pi/4)) \right] \text{ or}$$

$$r_2 = e_2 \cdot C \cdot \left[ \cdot \text{sign}(\cos(2\pi f_s t)) - j\text{sign}(\sin(2\pi f_s t)) + (1-j) \cdot \frac{\sqrt{2}}{2} \cdot \text{sign}(\sin(2\pi f_s t + \pi/4)) + (-1-j) \cdot \frac{\sqrt{2}}{2} \cdot \text{sign}(\sin(2\pi f_s t - \pi/4)) \right] \text{ or}$$

$$r_3 = e_3 \cdot C \cdot \left[ \cdot j \cdot \text{sign}(\cos(2\pi f_s t)) + j\text{sign}(\sin(2\pi f_s t)) + (-1+j) \cdot \frac{\sqrt{2}}{2} \cdot \text{sign}(\sin(2\pi f_s t + \pi/4)) + (-1-j) \cdot \frac{\sqrt{2}}{2} \cdot \text{sign}(\sin(2\pi f_s t - \pi/4)) \right] \text{ or}$$

$$r_4 = e_4 \cdot C \cdot \left[ \cdot j \cdot \text{sign}(\cos(2\pi f_s t)) - j\text{sign}(\sin(2\pi f_s t)) + (1+j) \cdot \frac{\sqrt{2}}{2} \cdot \text{sign}(\sin(2\pi f_s t + \pi/4)) + (1-j) \cdot \frac{\sqrt{2}}{2} \cdot \text{sign}(\sin(2\pi f_s t - \pi/4)) \right]$$

wherein a time offset ($\Delta t(e_1), \Delta t(e_2), \Delta t(e_3), \Delta t(e_4)$) is obtained between the navigation code ($e_1(t), e_2(t), e_3(t), e_4(t)$) and the at least one reference signal ($r_1, r_2, r_3, r_4$), and the time offset is used as a basis for position determination of the user terminal.

* * * * *